United States Patent
Wong et al.

(10) Patent No.: US 8,456,973 B1
(45) Date of Patent: Jun. 4, 2013

(54) OPTICAL DISC DRIVE TEST

(75) Inventors: Ming Hee Wong, Cupertino, CA (US);
Khanh Gia Tran, Sacramento, CA (US);
Kenneth A Kotyuk, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/454,279

(22) Filed: Apr. 24, 2012

(51) Int. Cl.
*G11B 7/00* (2006.01)

(52) U.S. Cl.
USPC ...... 369/47.53; 369/47.5; 369/53.2; 369/53.1

(58) Field of Classification Search
None
See application file for complete search history.

(56) References Cited

U.S. PATENT DOCUMENTS

| 574,858 | A | 5/1998 | Shimizu |
| 756,557 | A1 | 7/2009 | Murotani |
| 796,932 | A1 | 6/2011 | Pratt et al. |
| 2006/0146672 | A1* | 7/2006 | Kim et al. ............... 369/47.53 |
| 2009/0316551 | A1* | 12/2009 | Shu et al. ............... 369/53.31 |
| 2010/0169714 | A1 | 7/2010 | Takahashi |

FOREIGN PATENT DOCUMENTS

JP 6314430 11/1994

* cited by examiner

*Primary Examiner* — Muhammad N Edun (57) ABSTRACT

Embodiments disclosed herein relate to an optical disc drive test. In one embodiment, an optical disc drive of a host electronic device performs a test on itself. The host electronic device requests information about the test from the optical disc drive. The optical disc drive reports information about the test in response to the request.

15 Claims, 5 Drawing Sheets

OPTICAL DISC DRIVE TEST

BACKGROUND

A host electronic device may include an optical disc drive, such as a Blu-Ray drive, DVD, or a CD-ROM drive. The optical disc drive may read information from or write information to media inserted into the optical disc drive, and the optical disc drive may communicate the information read from or written to the media to the host electronic device.

BRIEF DESCRIPTION OF THE DRAWINGS

The drawings describe example embodiments. The following detailed description references the drawings, wherein.

DETAILED DESCRIPTION

A host electronic device may include an optical disc drive, and the optical disc drive may include a testing module to perform diagnostic tests on itself. The optical disc drive may initiate a test, perform the test, and record results without intervention from the host electronic device. For example, the optical disc drive may begin a test at power on or restart of the host electronic device. The optical disc drive may record results of the test and provide the results to the host electronic device in response to a request for test status information from the host electronic device. For example, the host electronic device may poll the optical disc drive at intervals to determine if the test is complete.

In one implementation, the optical disc drive may initiate the self-test on its own or in response to a command from the host electronic device. A first set of tests may be initiated by the optical disc drive, and a user my initiate a second set of tests or a repeat of one of the self-initiated tests. As an example, the optical disc drive may self initiate tests on the optical disc drive unrelated to interacting with media in the optical disc drive, and the host electronic device may initiate tests on the optical disc drive either related or unrelated to interacting with media in the optical disc drive. The host electronic device may initiate the tests, for example, in response to user input.

The optical disc drive and host electronic device may communicate information about the self-tests performed on the optical disc drive via a communication interface, such as a Serial Advanced Technology Attachment (SATA) interface using a protocol for communicating diagnostic testing information. In some cases, the protocol may be standardized such that optical disc drive types or brands may be interchanged without updating the communication methods. For example, the method of communicating with the optical disc drive to determine test completion, test status, disc drive health status, and error information may in some cases not be dependent on the method used by the optical disc drive to conduct the test.

Figure 1:
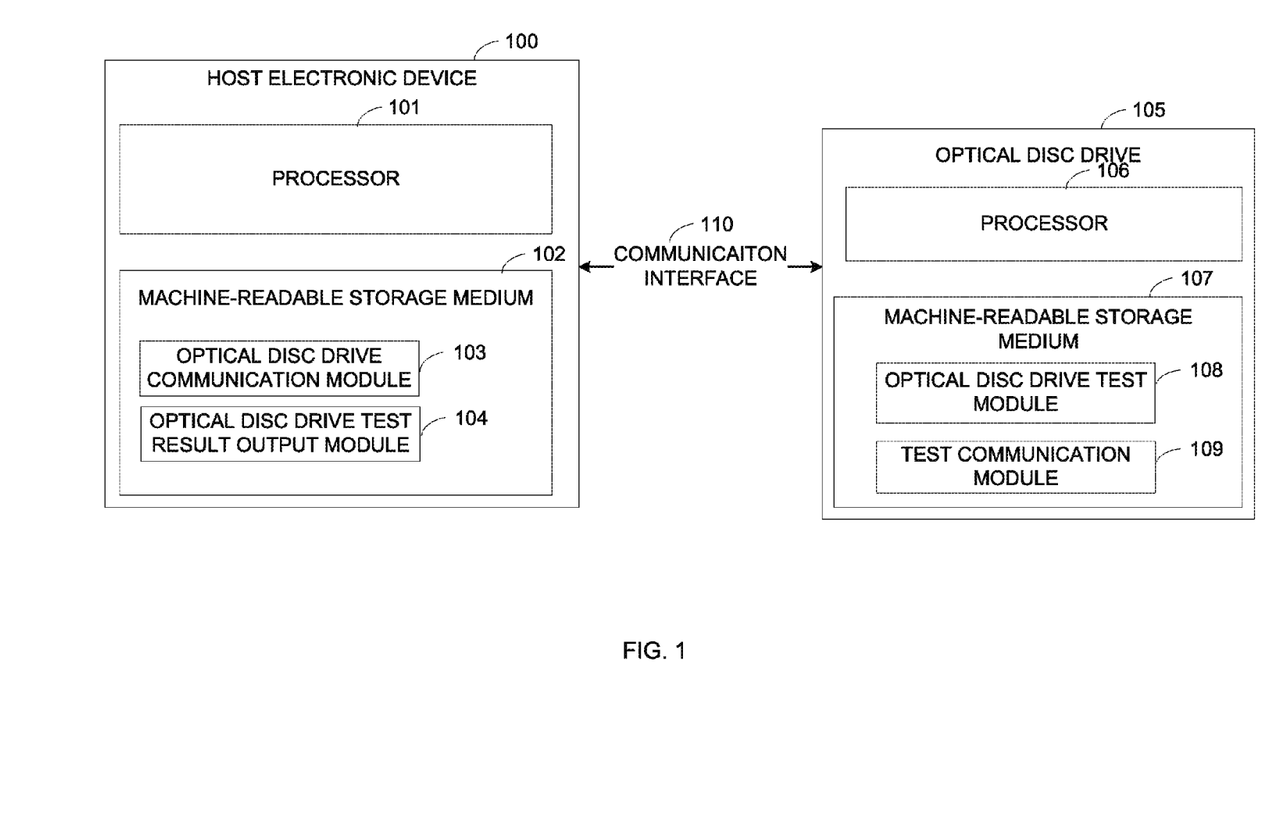
FIG. 1 is a block diagram illustrating one example of a host electronic device to communicate with an optical disc drive.

FIG. 1 is a block diagram illustrating one example of a host electronic device 100 to communicate with an optical disc drive 105 associated with the host electronic device 100. The optical disc drive 105 and host electronic device 100 may communicate information about diagnostic tests of the optical disc drive 105. For example, the optical disc drive 105 may initiate a self-test and communicate information about the self-test to the host electronic device 100.

The host electronic device 100 may be any suitable host electronic device, such as a desktop or laptop computer. The optical disc drive 105 may be a drive for receiving removable media for communicating with the host electronic device 100. For example, the optical disc drive 105 may be a CD-ROM drive, DVD, or Blu-Ray drive. The optical disc drive 105 may be included within the host electronic device 100 such that the host electronic device 100 has an opening for receiving the media into the optical disc drive 105. The optical disc drive 105 may communicate with the host electronic device 100 via the communication interface 110, such as a Serial Advanced Technology Attachment (SATA) interface. The host electronic device 100 may send information to and receive information from the optical disc drive 105 via the communication interface 110. In one implementation, the host electronic device 100 includes multiple optical disc drives and may communicate test information with each of the optical disc drives.

The host electronic device 100 may include a processor 101 and a machine-readable storage medium 102. The processor 101 may be any suitable processor, such as a central processing unit (CPU), a semiconductor-based microprocessor, or any other device suitable for retrieval and execution of instructions. In one embodiment, the host electronic device 100 includes logic instead of or in addition to the processor 101. As an alternative or in addition to fetching, decoding, and executing instructions, the processor 101 may include one or more integrated circuits (ICs) or other electronic circuits that comprise a plurality of electronic components for performing the functionality described below. In one implementation, the host electronic device 100 includes multiple processors. For example, one processor may perform some functionality and another processor may perform other functionality.

The machine-readable storage medium 102 may be any suitable machine readable medium, such as an electronic, magnetic, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may include an optical disc drive test module 103 for communicating with the optical disc drive 105 about diagnostic tests performed on the optical disc drive 105 by the optical disc drive 105. The optical disc drive 105 may initiate a self-test on the optical disc drive 105, and the host electronic device 100 may periodically request information from the optical disc drive 105 about the status of the test, such as information about the successful or unsuccessful completion of the test.

The machine-readable storage medium 102 may include optical disc drive test output module 103 to output results related to a diagnostic test performed on the optical disc drive 105. For example, the optical disc drive test output module 103 may include instructions to output diagnostic test information received from the optical disc drive 105 to a storage, to another application, or to a display. In one implementation, the host electronic device 100 may have criteria to determine how to output the results, such as which results to provide to a user or how much information about an unsuccessful test to provide to a user.

The optical disc drive 105 may include a processor 106 and a machine-readable storage medium 107. The processor 106 may be any suitable processor, such as a semiconductor-based microprocessor, or any other device suitable for retrieval and execution of instructions. In one embodiment, the optical disc drive 105 includes logic instead of or in addition to the processor 106. As an alternative or in addition to fetching, decoding, and executing instructions, the processor 106 may include one or more integrated circuits (ICs) or other electronic circuits that comprise a plurality of electronic components for performing the functionality described below. In one implementation, the optical disc drive 105 includes multiple processors. For example, one processor may perform some functionality and another processor may perform other functionality.

The machine-readable storage medium 107 may be any suitable machine readable medium, such as an electronic, magnetic, or other physical storage device that stores executable instructions or other data (e.g., a Read Only Memory (ROM), etc.). The machine-readable storage medium 107 may be, for example, a computer readable non-transitory medium.

The machine-readable storage medium 107 may include optical disc drive test module 108 and test communication module 109. The optical disc drive test module 108 may include instructions for performing a diagnostic test on the optical disc drive 105. For example, the optical disc drive test module 108 may include instructions for initiating a test on the optical disc drive 105 in response to initialization of the host electronic device 100, such as during power on or restart. The optical disc drive test module 108 may include instructions related to tests to be performed on the optical disc drive 105. The tests may be, for example, related to the optical disc drive hardware or to the optical disc drive's ability to communicate with media inserted in the optical disc drive 105. The tests may include tests on the optical disc drive's 105 Digital Signal Processing (DSP), Optical Pick-Up Head (OPU), Dynamic Random Access Memory (DRAM), Flash Read Only Memory (ROM), spindle motor, stepping motor, or tray motor. The diagnostic tests may include media related tests, such as tests related to media recognition, non-supported media types, read function, write function, and disc media quality.

The test communication module 109 may include instructions to communicate information about the diagnostic test to the host electronic device 100. For example, the host electronic device 100 may request information from the optical disc drive 105 about the status of the test. The optical disc drive 105 may return information indicating that the test is pending or complete and information about the successfulness of a completed test. The host electronic device 100, executing instructions stored in the optical disc drive communication module, may periodically poll the optical disc drive 105 to receive information about the test until information is received indicating that the test is complete. The host electronic device 100 may execute instructions stored in the optical disc drive test result output module 104 to output results of the test received from the optical disc drive 105.

In one implementation, the host electronic device 100 may further communicate a command to perform a self-test to the optical disc drive 105. For example, the host electronic device 100 may request a particular type of test at a specific interval, such as once a month, or a user may indicate that a specific test should be requested. The optical disc drive 105 may automatically perform a first test and may perform a second test or a repeat of the first test in response to a command from the host electronic device 100.

In one implementation, the optical disc drive communication module 103 and the test communication module 109 include instructions for communicating using a standardized protocol. The protocol may include, for example, a method for the host electronic device 100 to send a command to the optical disc drive 105 to request a test, a method for the host electronic device 100 to request status information about a test, and a method for the host electronic device 100 to request error information about a test. In some implementations, a single method may include a request for status and error information, such as where either a success code or an error code indicating a particular error may be returned to the host electronic device 100.

Figure 2:
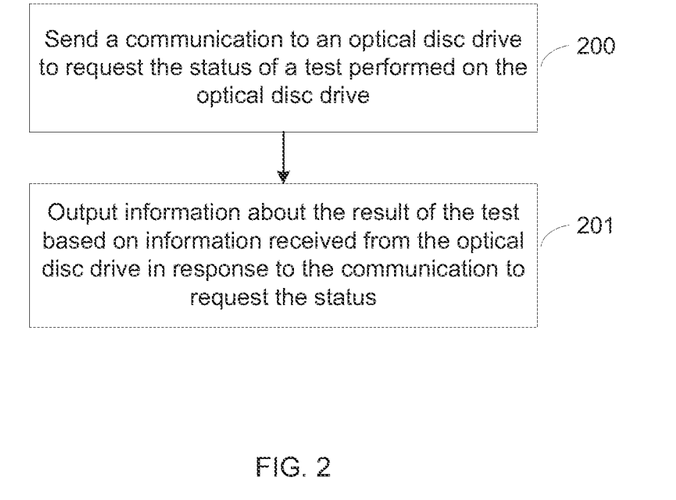
FIG. 2 is a flow chart illustrating one example of a method for a host electronic device to communicate with an optical disc drive about a self-test that resides on the optical disc drive performed by the optical disc drive.

FIG. 2 is a flow chart illustrating one example of a method for a host electronic device to communicate with an optical disc drive about a self-test that resides on the optical disc drive performed by the optical disc drive. The optical disc drive may perform the diagnostic test, and the host electronic device may periodically request status information about the test from the optical disc drive. The host electronic device may receive information from the optical disc drive related to the diagnostic test, and the host electronic device may determine how to output the information related to the results of the test. The method may be performed, for example, by the host electronic device 100 in FIG. 1.

The optical disc drive, such as the optical disc drive 105 from FIG. 1, may perform a self diagnostic test in response to initialization of the host electronic device. For example, the optical disc drive may perform a diagnostic test in response to power on or restart of the host electronic device. In one implementation, the optical disc drive may perform a test in response to a command received from the host electronic device. For example, the optical disc drive may perform a non-media related test on initialization of the host electronic device, and the host electronic device may send a command to the optical disc drive to perform a media related diagnostic test, such as a test related to read or write function. The diagnostic test may be any suitable test. For example, the diagnostic test may include tests related to Digital Signal Processing (DSP), Optical Pick-Up Head (OPU), Dynamic Random Access Memory (DRAM), Flash Read Only Memory (ROM), spindle motor, stepping motor, tray motor, media recognition, non-supported media types, read function, write function, or disc write quality.

Beginning at 200, the host electronic device sends a communication to an optical disc drive to request the status of a self-test performed on the optical disc drive. For example, the host electronic device may poll the optical disc drive to request the status of the test. The host electronic device may request the status of the test at a particular time or interval or at particular points in the initialization process. The host electronic device may request the status information using a communication protocol that provides an application programming interface (API) for communicating with the optical disc drive.

The test may be initiated by the optical disc drive or in response to a command from the host electronic device. The optical disc drive may perform the test and record the results. The optical disc drive may send information about the results to the host electronic device in response to the next request for information from the host electronic device. During the performance of the test, the optical disc drive may respond to the request from the host electronic device with a response code indicating the pendency of the diagnostic test.

The host electronic device may receive any suitable response from the optical disc drive. The host electronic device may receive an indication of success or information about a detected error. In one implementation, the host electronic device receives information about multiple tests. For example, the optical disc drive may return information about a first error found with a first test and a second error found with a second test. The optical disc drive may return information indicating a failure, a level of failure, or a warning of future failure. In some cases, the optical disc drive may return a result indicating that the test was successful along with a warning indicating the possibility of future failure or an expected time period of future failure. The host electronic device may send another communication requesting specific information about the test in response to information from the optical disc drive that the diagnostic test completed.

In one implementation, the host electronic device requests a second type of test based on the results of the first test. For example, the optical disc drive may perform a first test automatically in response to host electronic device initialization, and the host electronic device may send a command to the optical disc drive to perform a second test based on the results of the first test. In one implementation, the host electronic device may provide results to a user about a self-initiated test, and the user may then request a subsequent test to further investigate the problem. The host electronic device may send a command to the optical disc drive to perform the test and then periodically request information about the requested test.

Continuing to 201, the host electronic device outputs information about the result of the test based on information received from the optical disc drive in response to the communication to request the status. For example, the host electronic device may store, transmit, or display information about the result. In one implementation, the host electronic device creates a human readable warning to a user based on the result and displays the human readable warning on a display device associated with the host electronic device.

The host electronic device may determine a method for outputting the results and what type of information related to the results to output. For example, for a self-initiated test, the host electronic device may display errors over a higher level of severity to a user compared to those displayed to a user where the user initiated the test. The host electronic device may determine whether to provide information about the results to a user, such as by displaying them or providing them to another application. For example, information about a successful test may be stored where the test was self-initiated, but information about a successful test may be provided to a user where the test was initiated by the user. In one implementation, the host electronic device evaluates information related to user preferences to determine which results to provide to a user and how to provide them. For example, a user may input information in a user interface indicating that errors above a particular severity level should be provided. The host electronic device may receive an error code from the optical disc drive and determine the level of severity associated with the error code, such as high, medium, or low level. In some cases, the user may indicate that warnings should be provided to the user in addition to information about existing defects. The host electronic device may determine how to provide information on the error. For example, more information may be provided about a high level error, or more information may be provided about an error where the user initiated the diagnostic test.

Figure 3A:
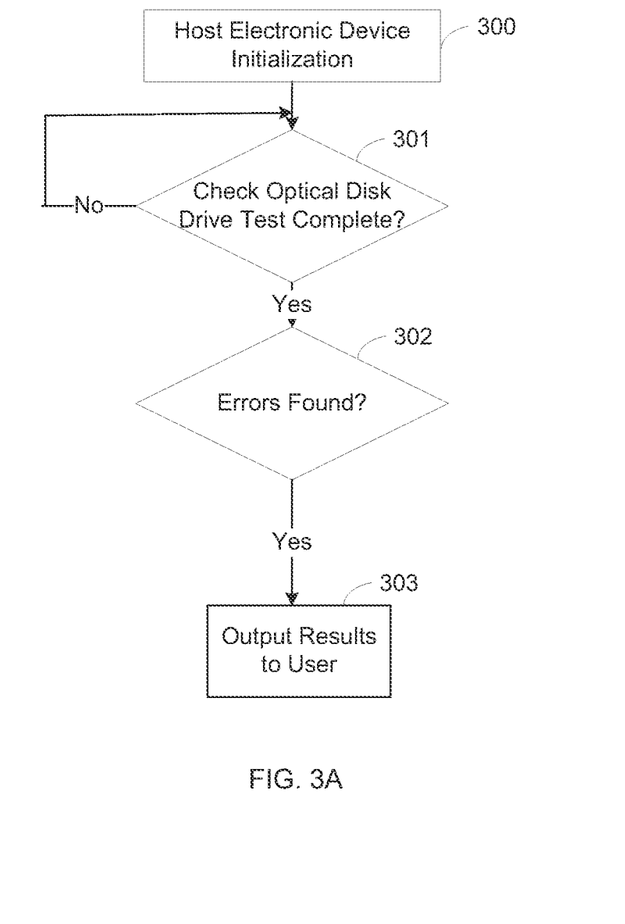
FIG. 3A is a flow chart illustrating one example of a method for a host electronic device to communicate with an optical disc drive about a self-test performed automatically upon initialization of the host electronic device.

FIG. 3A is a flow chart illustrating one example of a method for a host electronic device to communicate with an optical disc drive about a self-test performed automatically upon initialization of a host electronic device. Beginning at 300, the host electronic device initializes, such as from a system power on or system restart. At 301, the host electronic device communicates with the optical disc drive to determine whether the optical disc drive test is complete. If the host electronic device receives a response indicating the test is still in progress, the host electronic device requests the status of the test again at a later time. The host electronic device may periodically continue to request information about the status of the test until the host electronic device receives information that the test is complete.

If the host electronic device receives a response that the test is complete, the host electronic device moves to 302. At 302, the host electronic device, determines whether the result received from the optical disc drive indicates that an error was found. If an error was found, the host electronic device moves to 303 to output the results to a user, such as by displaying them or storing them for later display to a user. In a case where the host electronic device did not request the optical disc drive test, the host electronic device may not output results to the user where the test is successful. In some cases, the host electronic device may output a subset of errors to users, such as those above a particular severity level.

Figure 3B:
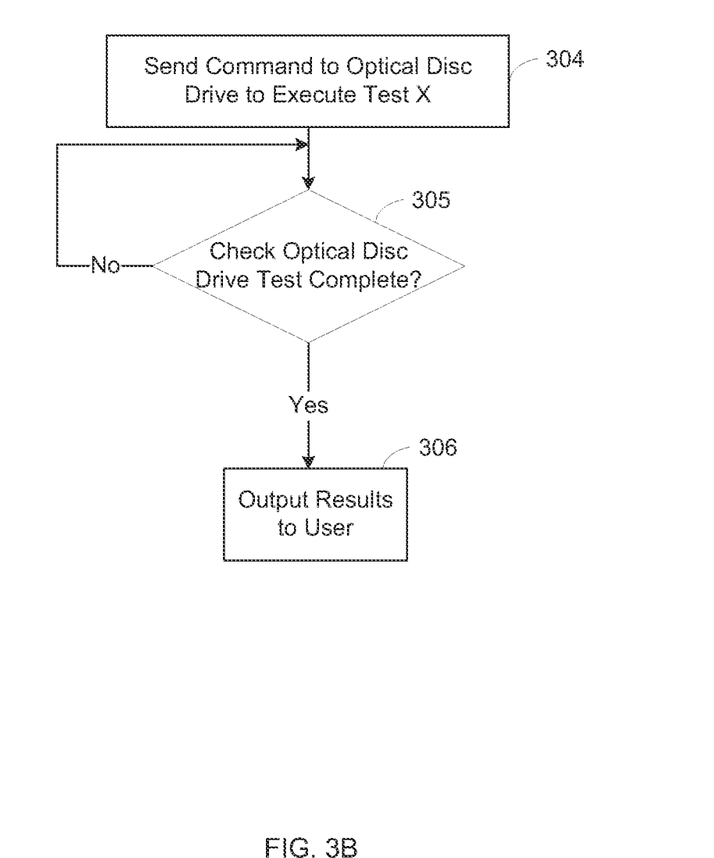
FIG. 3B is a flow chart illustrating one example of a method for a host electronic device to communicate with an optical disc drive about results or status information related to a self-test performed in response to a command from the host electronic device.

FIG. 3B is a flow chart illustrating one example of a method for a host electronic device to communicate with an optical disc drive about results or status information related to a self-test performed in response to a command from the host electronic device. For example, a host electronic device may communicate with an optical disc drive to indicate a self-test for the optical disc drive to perform on itself. A host electronic device may receive user input related to performing test X on an optical disc drive associated with the host electronic device. In some implementations, the host electronic device may select the test based on user input. For example, the host electronic device may create a user interface to allow a user to select an available test. The tests may include tests on the optical disc drive that use media within the optical disc drive or do not use media within the optical disc drive. The host electronic device may request a test based on previous user input, such as input to conduct a test at a particular interval or each time the system is initialized.

Beginning at 304, the host electronic device sends a command to the optical disc drive to perform test X. The host electronic device may send the command via a communication interface, such as a Serial Advanced Technology Attachment (SATA) interface, for communicating with the optical disc drive. The command may be sent using a protocol for communicating testing information between a host electronic device and optical disc drive. The optical disc drive may perform test X on itself in response to receiving the command. The optical disc drive may have instructions related to performing the test in a storage, such as Read Only Memory (ROM), associated with the optical disc drive.

At 305, the host electronic device requests information from the optical disc drive to determine whether the test is complete. If the test is not complete, the host electronic device may periodically request information about the status from the optical disc drive until the host electronic device receives a response to its request indicating that the test is complete. For example, the response may indicate that the test was successful or that an error was found. In one implementation, the optical disc drive returns information about the completion of the test, and the host electronic device sends a second request about the success or errors found during the test. For example, a testing communication protocol may include a method for requesting information about the success of the test.

At 306, the host electronic device outputs the results. In some cases, the host electronic device may determine whether to output the results based on stored criteria. In some implementations, the results may be output to a user where a user requests the test where the results would not be output to a user if the test were initiated automatically. For example, the host electronic device may display information about the successful completion of a test to a user where the user requested the test.

Figure 4:
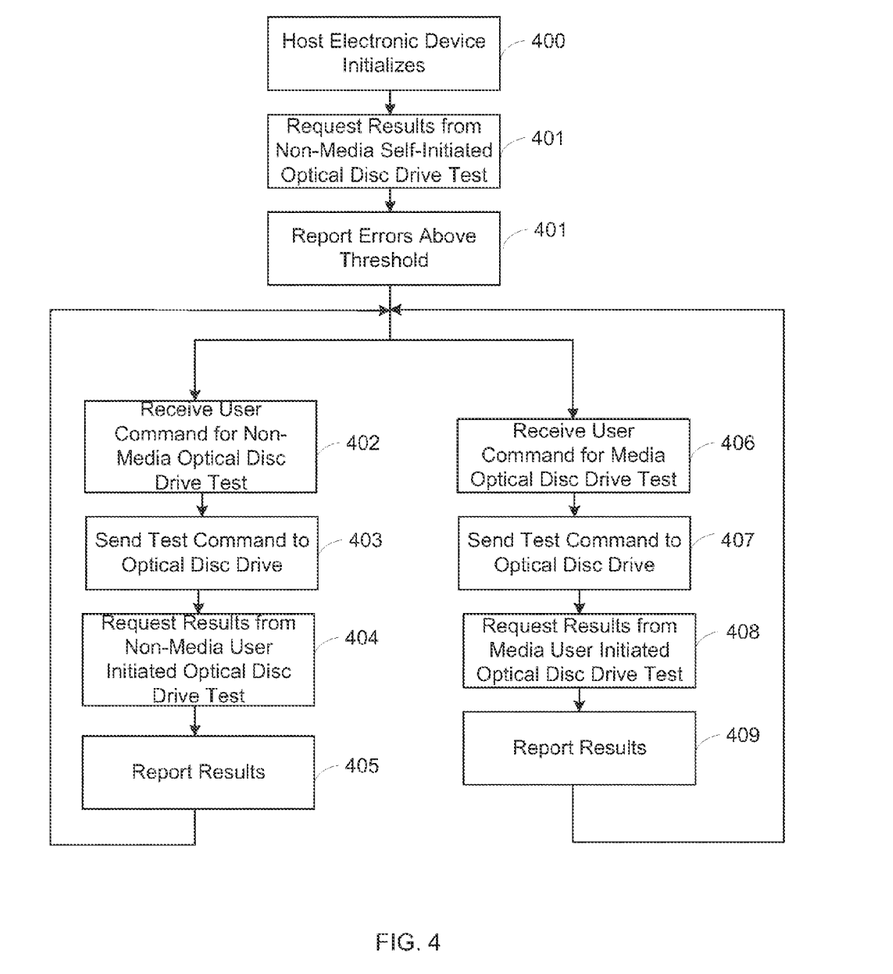
FIG. 4 is a flow chart illustrating one example of a method to conduct diagnostic self-tests on an optical disc drive.

FIG. 4 is a flow chart illustrating one example of a method to conduct diagnostic self-tests on an optical disc drive. For example, an optical disc drive may initiate a first test in response to initialization of a host electronic device and may perform a second test in response to a command from the host electronic device.

Beginning at 400, the host electronic device initializes, such as due to power on or system restart. The optical disc drive may receive power from the host electronic device when the host electronic device initializes. Upon receiving power, the optical disc drive may begin to perform a test or set of tests on itself. The tests may be related to non-media aspects of the optical disc drive, such as tests related to a spindle motor of the optical disc drive. At 401, the host electronic device receives results from the optical disc drive about the diagnostic test. The results may be received in response to periodic polling from the host electronic device. For example, the host electronic device may continue to request information from the optical disc drive about the status of the diagnostic test until the response from the optical disc drive indicates that the test is complete. In some cases, the test may be complete where it is terminated midway through the test due to an error. At 401, the host electronic device reports errors above a threshold. For example, the host electronic device may store the results and display results above a severity threshold.

The host electronic device may provide a user interface to allow a user to select a diagnostic test to be formed by the optical disc drive. In some cases, a user may enter a command to initiate a test on the optical disc drive. The test may be a media related test or a non-media related test. The host electronic device may receive user input requesting a first test and then requesting a second test, such as after a user analyzes the results from a first test. A user may request a diagnostic test in any suitable order and at any suitable time during the operation of the host electronic device. In some implementations, a user may request the same test as that performed automatically, and the host electronic device may provide more information about the results of the test when requested by a user.

At 402, the host electronic device receives a user command to perform a non-media optical disc drive test. At 403, the host electronic device sends a command to perform the test to the optical disc drive, such as using a diagnostic testing communication protocol. The test may be the same test previously conducted upon initialization of the host electronic device or a different test. At 404, the host electronic device requests results from the non-media user initiated optical disc drive test. The host electronic device may periodically poll the optical disc drive until the host electronic device receives a response from the optical disc drive indicating the completion of the test. At 405, the host electronic device reports the results. For example, the host electronic device may display information indicating the successful or unsuccessful completion of the test. After displaying the results, the host electronic device may receive a user command for another non-media related test or a media related test, or the host electronic device may continue operation without a subsequent request from the user.

At 406, the host electronic device receives a user command for a media related optical disc drive test. The command may be received instead of or in addition to a request for a non-media related test at 402. The media related test may be a test related to the optical disc drive's ability to communicate with media inserted into the optical disc drive. At 407, the host electronic device sends a command to the optical disc drive to perform the selected test. At 408, the host electronic device receives results from the media related user initiated optical disc drive test. The host electronic device may receive the results in response to a request from the host electronic device to optical disc drive about the status of the test. The host electronic device may continue to request information about the status of the test until receiving a response indicating the completion of the test. At 409, the host electronic device reports the results of the test, such as by displaying information about the results to the user. Afterwards, the host electronic device may receive a command to perform a non-media related optical disc drive test, a command to perform a media related optical disc drive test, or the host electronic device may continue in operation without a further test request from the user.

The invention claimed is:

1. A host electronic device, comprising:
   a communication interface to communicate with an optical disc drive;
   a machine-readable non-transitory storage medium comprising instructions to:
   send a communication to the optical disc drive to request the status of a test performed on the optical disc drive initiated by the optical disc drive; and
   output information about the result of the test based on information received from the optical disc drive in response to the communication to request the status of the tests; and
   a processor to execute the instructions stored in the machine-readable storage medium.

2. The host electronic device of claim 1, wherein the machine-readable storage medium further comprises instructions to select a test to request to be performed on the optical disc drive based on user input.

3. The host electronic device of claim 1, wherein the machine-readable storage medium further comprises instructions to send a communication to the optical disc drive to request a test to be performed on the optical disc drive.

4. The host electronic device of claim 3, wherein instructions to output information about the result comprise instructions to output information about the result based on whether the test was initiated by the optical disc drive or by a communication from the host electronic device.

5. The host electronic device of claim 1, wherein instructions to send a communication to the optical disc drive comprises instructions to poll the optical disc drive at an interval.

6. The host electronic device of claim 1, wherein the optical disc drive comprises a machine-readable storage medium comprising instructions to test the optical disc drive.

7. The host electronic device of claim 6, wherein the instructions to test the optical disc drive comprise a first test related to media in the optical disc drive and a second test not related to media in the optical disc drive.

8. A method, comprising:
   performing, by a processor on an optical disc drive, a self-test of a function of the optical disc drive using testing instructions stored on the optical disc drive, wherein the test is performed in response to at least one of a command from a host electronic device in communication with the optical disc drive or initialization of the host electronic device; and reporting, by the processor, status information about the test in response to a request from the host electronic device.

9. The method of claim 8, further comprising storing information about the test and wherein reporting status information about the test comprises reporting the stored information.

10. The method of claim 8, wherein a first test type is performed in response to initialization of the host electronic device and a second test type is performed in response to a command from the host electronic device.

11. The method of claim 8, further comprising, repeating, by the host electronic device, a request for information about the status of the test at an interval.

12. A machine-readable non-transitory storage medium comprising instructions executable by an optical disc drive to:

test a function of the optical disc drive;

perform the test in response to a command from a host electronic device in communication with the optical disc drive;

perform the test in response to initialization of the host electronic device; and report status information about the test in response to a request from the host electronic device.

13. The machine-readable non-transitory storage medium of claim 12, further comprising instructions to initiate a second test related to media in the optical disc drive in response to a command from the host electronic device.

14. The machine-readable non-transitory storage medium of claim 12, wherein instructions to report status information comprise instructions to report information about a defect detected during the test.

15. The machine-readable non-transitory storage medium of claim 14, further comprising instructions to store defect information about the test on the optical disc drive, and wherein instructions to report information about a defect comprise instructions to report information from the stored defect information.

* * * * *